(No Model.)
F. A. REICHARDT.
FILTER.
No. 538,348. Patented Apr. 30, 1895.
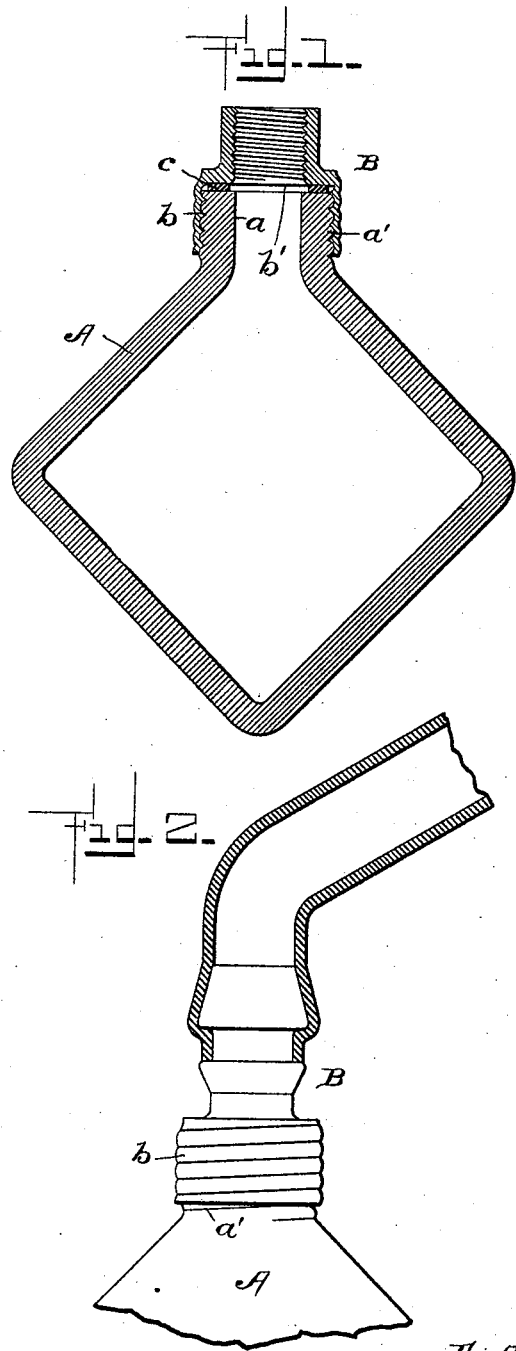
Witnesses:
T. S. Hardwig
G. P. Norris
Inventor.
F. Alfred Reichardt.
By A. M. Smith & Son,
Attorneys.

UNITED STATES PATENT OFFICE.

FERDINAND ALFRED REICHARDT, OF NEW YORK, N. Y.

FILTER.

SPECIFICATION forming part of Letters Patent No. 538,348, dated April 30, 1895.

Application filed May 7, 1894. Serial No. 510,308. (No model.)

*To all whom it may concern:*

Be it known that I, FERDINAND ALFRED REICHARDT, a citizen of the United States, and a resident of New York, county of New York, and State of New York, have invented a new and useful Improvement in Filters, of which the following is a full, clear, and exact description, reference being had to the accompanying drawings, making part of this specification.

My invention relates to that class of filters composed of a porous substance, through which the liquid, to be acted upon, passes, in being filtered.

My improved filter is made in the form of a bottle, from fire-clay or similar material, which, after being given the desired form for use, is baked to complete the manufacture and which can afterward be placed in the fire for burning out all impurities collected by it in its use as a filter, whenever and as often as may be necessary for its purification or renewal. It will be understood from the following description and claim, reference being had to the accompanying drawings, in which—

Figure 1 represents a vertical or longitudinal section through a filter embodying my invention; and Fig. 2 represents the neck and its cap or coupling piece in side elevation, with the tube applied thereto, in section.

A indicates the bottle, made from fire-clay or similar material, which will stand baking or burning to harden and complete its manufacture and which is left in an unglazed or unvitrified and porous condition, adapting it for use as a filter. The body of the bottle is made, preferably, in the form of a hollow cube, porous on all its sides, which are so arranged that the liquid escaping through them will all tend to run down to and drip from its lowest point or angle, the water or other liquid to be acted upon, entering the mouth or neck of the bottle, indicated at $a$, and which is at the highest point or angle. The neck of the bottle is provided at $a'$, with a screw-thread, molded or otherwise formed thereon in the process of manufacture and of a character or form adapting it to be baked and, preferably, therefore of the rounded form shown, avoiding sharp angles, such as would be liable to be easily broken or injured in handling.

The cap or coupling piece B, is of metal and is provided at the end to be joined to the bottle, with an internal screw-thread $b$, conforming to the thread $a'$, and is preferably reduced in size above or beyond the neck of the bottle, forming a shoulder at $b'$, between which and the end of the neck $a$, an annular, packing washer $c$, of leather, india rubber, or other suitable material, is clamped, for insuring a tight joint between the bottle and its cap or coupling piece B. This packing ring obviates any necessity for nice fitting of the screw-thread connection, the latter serving to merely clamp the packing ring snugly in place and thereby adapting the cap to be easily and quickly removed, whenever it becomes necessary to purify or renew the bottle, by burning it out. The outer end of this cap or coupling piece B, is shown in Fig. 1, provided with a screw-thread adapting it to be attached to an ordinary water spout or hydrant, by being screwed thereon. This form is adapted for use where the liquid passes from the inside of the bottle, outward, in being filtered. In Fig. 2, the neck or outer end of the coupling piece, is shown provided with a tapering and shouldered end, adapting it to receive one end of a rubber tube or hose. In either case, the bottle, *per se*, can be readily detached or whenever its pores become obstructed or clogged and it can then be placed to dry and afterward in a hot fire, where all impurities, whether of microbes or of any other character, will be quickly consumed, thereby renewing the filtering properties of the bottle and adapting it for further use.

The form of bottle described and the manner of coupling it to its supply or exhaust pipe, effectually guard it against impurities entering, except through the water supply and those entering thus, are thoroughly removed from the water in its passage through the porous walls.

The form of the filter serves to insure its purification by burning, as it is preferably rendered inaccessible for cleansing by other means than burning, as explained, that being regarded as the only thoroughly practicable way in which to destroy germs and other impurities that may obstruct the pores. For this latter reason, it is essential that the filter be made from fire-clay or similar material which will bear repeated burning or roasting, for the purpose explained, and still retain its porous, filtering properties.

Having thus described my invention, what I claim as new, and desire to secure by Letters Patent, is—

A filtering bottle made from a plastic material which will be rendered porous and hard by firing, molded in the form of a hollow cube and provided at one of its corners with an open, screw-threaded neck to receive and in combination with a screw-threaded pipe-coupling piece permitting its ready removal for re-firing, all substantially as and for the purpose described.

In testimony whereof I have hereunto set my hand this 5th day of May, A. D. 1894.

F. ALFRED REICHARDT.

Witnesses:
EDWARD GLINDY,
EMMA C. ROGERS.